US007088775B2

(12) United States Patent
Sato et al.

(10) Patent No.: US 7,088,775 B2
(45) Date of Patent: Aug. 8, 2006

(54) APPARATUS AND METHOD FOR CONVERTING IMAGE DATA

(75) Inventors: Kazushi Sato, Kanagawa (JP); Kuniaki Takahashi, Kanagawa (JP); Zhu Yiwen, Kanagawa (JP); Teruhiko Suzuki, Chiba (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 1116 days.

(21) Appl. No.: 09/765,852

(22) Filed: Jan. 19, 2001

(65) Prior Publication Data
US 2001/0010706 A1    Aug. 2, 2001

(30) Foreign Application Priority Data
Jan. 21, 2000    (JP) .......................... P2000-017828

(51) Int. Cl.
*H04B 1/66* (2006.01)
(52) U.S. Cl. .............................. 375/240.17; 375/240.25
(58) Field of Classification Search ........... 375/240.12; 382/248
See application file for complete search history.

(56) References Cited

U.S. PATENT DOCUMENTS

| 5,436,665 | A * | 7/1995 | Ueno et al. ............ 375/240.14 |
| 6,243,419 | B1 * | 6/2001 | Satou et al. ........... 375/240.13 |
| 6,259,734 | B1 * | 7/2001 | Boon ....................... 375/240 |
| 6,532,309 | B1 * | 3/2003 | Sato et al. ................... 382/248 |
| 6,539,056 | B1 * | 3/2003 | Sato et al. ............. 375/240.17 |
| 6,748,018 | B1 * | 6/2004 | Sato et al. ............. 375/240.21 |

OTHER PUBLICATIONS

Feamster, Wee, Apostolopoulos; Field-to-Frame Transcoding with Spacial and Temporal Downsampling; 1999; IEEE.*

* cited by examiner

*Primary Examiner*—Chris Kelley
*Assistant Examiner*—Justin Shepard
(74) *Attorney, Agent, or Firm*—Lerner, David, Littenberg, Krumholz & Mentlik, LLP

(57) ABSTRACT

An image data converting apparatus comprising an MPEG2-image data decoding section 19, a scan-converting section 20, an MPEG4-image encoding section 21, and a picture-type determining section 18. The MPEG2-image data decoding section 19 decodes input MPEG2-image compressed data in both the vertical direction and the horizontal direction by using only lower, fourth-order coefficients. The scan-converting section 20 converts interlaced-scan pixel data to sequential-scan pixel data. The MPEG4-image encoding section 21 generates MPEG4-image compressed data from the sequential-scan pixel signals. The sections 19, 20 and 21 are connected in series. The picture-type determining section 18 is connected to the input of the MPEG2-image data decoding section 19. The section 18 determines the picture type of each frame data contained in the interlaced-scan MPEG4-picture compressed data, outputs only the frame data about I/P pictures, discards the frame data about B pictures, thereby converting the frame rate.

39 Claims, 14 Drawing Sheets

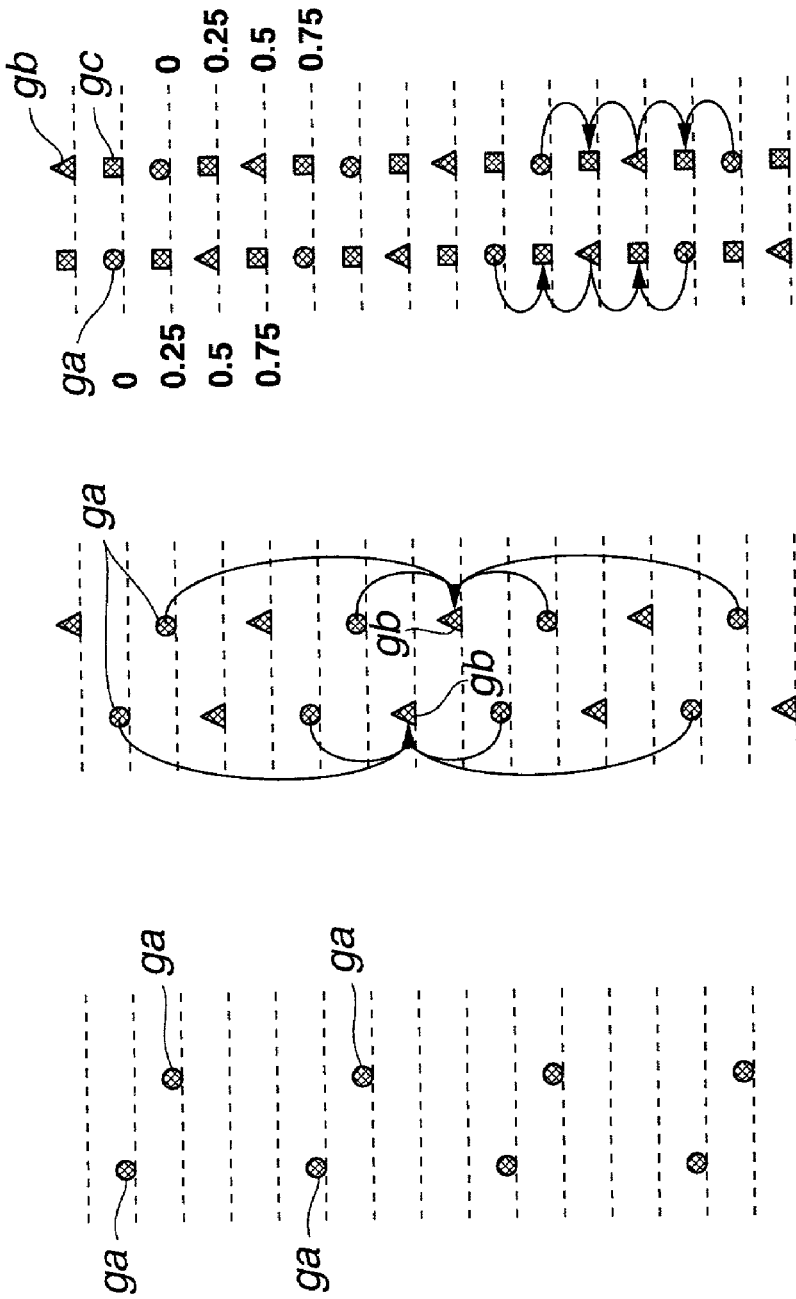

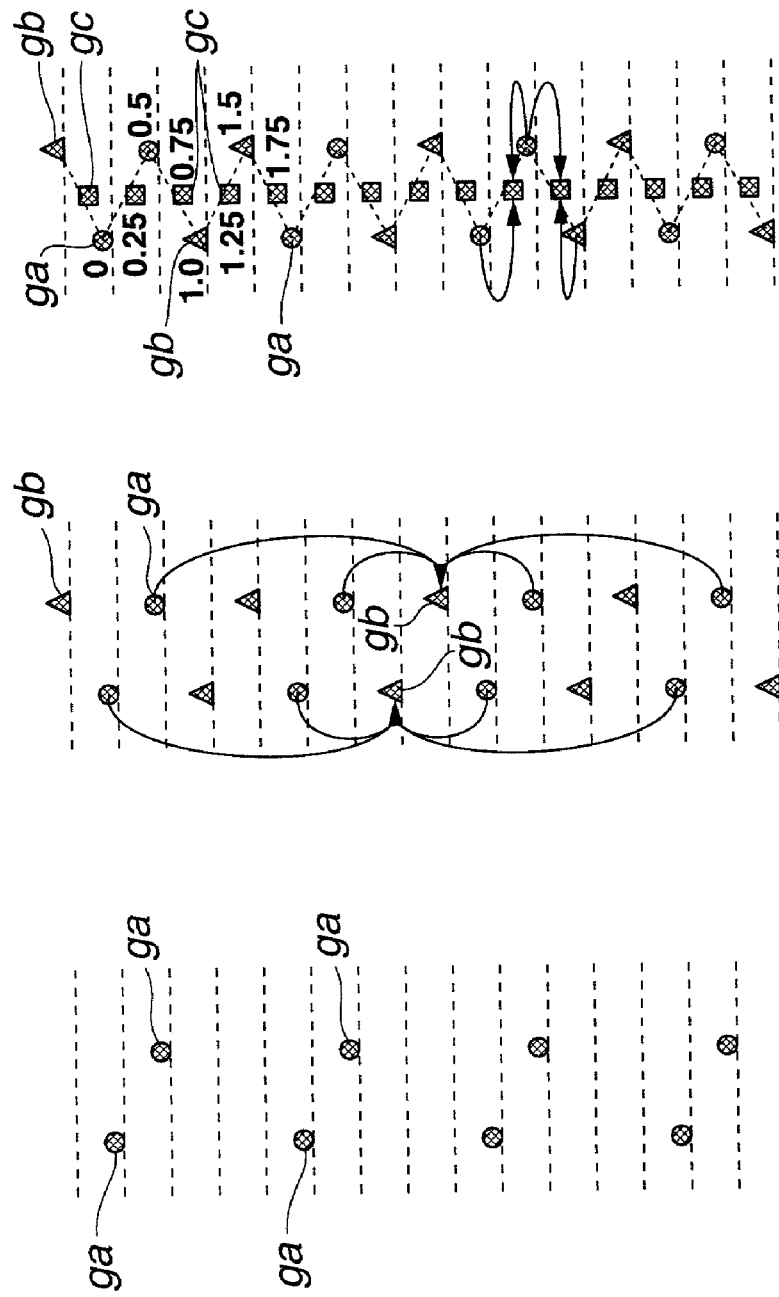

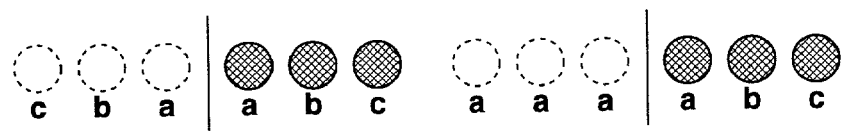
FIG.10A       FIG.10B
  PIXEL DATA ITEMS STORED IN VIDEO MEMORY
  VIRTUAL PIXELS OUTSIDE FRAME, WHICH ARE REQUIRED FOR INTERPOLATION ⬢ PIXEL VALUES STORED IN VIDEO MEMORY
◯ PIXEL VALUES TO BE REPLACED BY 0s

APPARATUS AND METHOD FOR CONVERTING IMAGE DATA

CROSS-REFERENCE TO RELATED APPLICATIONS

This application claims priority from Japanese Application No. 2000-017828 filed Jan. 21, 2000.

BACKGROUND OF THE INVENTION

The present invention relates to an apparatus and method for converting image data. The apparatus and the method are suitable in receiving compressed image data (i.e., bit streams) through network media (e.g., satellite broadcast, cable television and the Internet). The image data may be one that has been compressed by orthogonal transformation (e.g., discrete cosine transform) and motion compensation, as in an MPEG (Moving Picture image coding Experts Group) system. The apparatus and the method are suitable, too, in processing image data recorded on storage media such as optical disks and magnetic disks.

In recent years, more and more apparatuses complying with the MPEG system are used in data-distributing facilities such as broadcast stations and data-receiving sites such as households. These apparatuses perform orthogonal transformation (e.g., discrete cosine transform) and motion compensation on digital image data that has redundancy, thereby compressing the image data. The image data can be transmitted and stored with a higher efficiency than in the case it is not so compressed at all.

In particular, MPEG2 (ISO/IEC 13818-2) is defined as a general-purpose system for encoding image data. This will be applied widely to professional use and consumer use, as a standard system that processes various types of image data, including interlaced-scan image data, sequential-scan image data, standard-resolution image data, and high-definition image data. If the MPEG2 data-compressing system is utilized, a high compression ratio and high-quality images will be achieved by allocating a bit rate of 4 to 8 Mbps to interlaced-scan images of standard resolution, each having 720×480 pixels. Also, a high compression ratio and high-quality images will be achieved by allocating a bit rate of 18 to 22 Mbps to interlaced-scan images of high resolution, each having 1920×1088 pixels.

This data-compressing system will be used to transmit image data in the digital broadcasting that will be put to general use. The system is designed to transmit not only standard-resolution image data but also high-resolution image data. The receiver needs to decode the two types of image data. To provide an inexpensive receiver that can decode both types of image data, it is required that some data be extracted from the high-resolution image data, while minimizing the inevitable deterioration of image quality. This requirement should be fulfilled not only in transmission media such as digital broadcasting, but also in storage media such as optical disks and flash memories.

To fulfill the requirement, the inventor hereof has proposed an image data decoding apparatus of the type shown in FIG. 1. As shown in FIG. 1, the apparatus comprises an code buffer 101, a data-compressing/analyzing section 102, a variable-length decoding section 103, an inverse quantization section 104, motion-compensating sections 108 and 109, video memory 110 and an adder 107. These components are basically identical in function to those incorporated in the ordinary MPEG encoding apparatuses.

In the apparatus of FIG. 1, the compressed image data input is supplied via the code buffer 101 to the data-compressing/analyzing section 102. The data-compressing/analyzing section 102 analyzes the compressed image data, thereby obtaining data that will be used to expand the image data. The data thus obtained is supplied to the variable-length decoding section 103, together with the compressed image data. The variable-length decoding section 103 performs variable-length decoding, i.e., a process reverse to the variable-length encoding that has been performed to generate the compressed image data. In the decoding section 103, however, only coefficients may be decoded and no other process may be carried out until the EOB (End of Block) is detected. These coefficients are required in a compression inverse discrete-cosine transform (4×4) section 105 or a compression inverse discrete-cosine transform (field separation) section 106, in accordance with whether the macro block is of field DCT mode or fame DCT mode. FIG. 2A and FIG. 2B show two operating principles the variable-length decoding section 103 assume to decode MPEG2-image compressed data (bit stream) that has been generated by zigzag scanning. More precisely, FIG. 2A depicts the operating principle that the decoding section 103 assumes to decode the compressed data in field DCT mode, and FIG. 2B illustrates the operating principle that the decoding section 103 assumes to decode the compressed data in frame DCT mode. FIG. 3A and FIG. 3B show two operating principles the variable-length decoding section 103 assume to decode MPEG2-image compressed data (bit stream) that has been generated by alternate scanning. To be more specific, FIG. 3A depicts the operating principle that the decoding section 103 assumes to decode the compressed data in field DCT mode, and FIG. 3B illustrates the operating principle that the decoding section 103 assumes to decode the compressed data in frame DCT mode. The numbers in FIGS. 2A, 2B, 3A and 3B indicate the order in which the data items have been generated by scanning. The data decoded by the variable-length decoding section 103 is supplied to the inverse quantization section 104. The inverse quantization section 104 performs inverse quantization on the input data. The data generated by the section 104 is supplied to the compression inverse discrete-cosine transform (4×4) section 105 or the compression inverse discrete-cosine transform (field separation) section 106. The section 105 or 106 performs inverse discrete-cosine transform on the input data.

The inverse quantization section 104 performs inverse quantization, generating a discrete-cosine transform coefficient. The discrete-cosine transform coefficient is supplied to either the discrete-cosine transform (4×4) section 105 or the discrete-cosine transform (field separation) section 106, in accordance with whether the macro block is of the field DCT mode or the frame DCT mode. The section 105 or the section 106 performs inverse discrete-cosine transform on the input data.

The macro block may be an intra macro block. In this case, the data subjected to compression inverse discrete-cosine transform is stored via the adder 107 into a video memory 110, without being further processed at all. If the macro block is an inter macro block, the data is supplied to the motion-compensating section 108 or the motion-compensating section 109, in accordance with whether the motion-compensating mode is a field-predicting mode or a frame-predicting mode. The section 108 or 109 effects interpolation which achieves ¼ pixel precision in both the horizontal direction and the vertical direction, by using the reference data stored in the video memory 110, thereby generating predicted pixel data. The predicted pixel data is supplied to the adder 107, together with the pixel data subjected to the inverse discrete-cosine transform. The adder 107 adds the predicted pixel data and the pixel data, generating a pixel value. The pixel value is stored into the video memory 110. As shown in FIGS. 4A and 4B, the lower-layer pixel value stored in the video memory 110 contains a phase difference between the first and second fields, with respect to the upper-layer pixel value. The circles shown in FIGS. 4A and 4B indicate the pixels.

The image data-decoding apparatus has a frame-converting section 111. The frame-converting section 111 converts the pixel value, which is stored in the video memory 110, to an image signal that represents an image of such a size as can be displayed by a display (not shown). The image signal output from the frame-converting section 111 is the decoded image signal that is output from the image decoding apparatus of FIG. 1.

The operating principles of the compression inverse discrete-cosine transform (4×4) section 105 and compression inverse discrete-cosine transform (field separation) section 106 will be described.

The compression inverse discrete-cosine transform (4×4) section 105 extracts the lower, fourth-order coefficients included in eighth-order discrete cosine transform coefficients, for both the horizontal component and the vertical component. Then, the section 105 performs fourth-order inverse discrete cosine transform on the fourth-order coefficients extracted.

On the other hand, the compression inverse discrete-cosine transform section 106 carries out the process that will be described below.

FIG. 5 illustrates the sequence of operations that the compression inverse discrete-cosine transform section 106 performs.

As shown in FIG. 5, the compression inverse discrete-cosine transform (field separation) section 106 first performs 8×8 inverse discrete cosine transform (IDCT) on the discrete cosine transform coefficients y1 to y8 contained in the compressed image data (bit stream) that is the input data. Data items x1 to x8, or decoded data items, are thereby generated. Then, the section 106 separates the data items x1 to x8 into first field data and second field data. The first field data consists of the data items x1, x3, x5 and x7. The second field data consists of data items x2, x4, x6 and x8. Next, the section 106 performs 4×4 discrete cosine transform (DCT) on the first field data, generating discrete cosine transform coefficients z1, z3, z5 and z7, and on the second field data, generating discrete cosine coefficients z2, z4, z6 and z8. Further, the section 106 performs 2×2 inverse discrete cosine transform on only the lower ones of each field data. Thus, compressed pixel values x'1 an x'3 are obtained for the first field data, and compressed pixel values x'2 an x'4 are obtained for the second field data. Then, the pixel values are subjected to frame synthesis, generating output values x'1, x'2, x'3 and x'4. In practice, the pixel values x1, x'2, x'3 and x'4 are obtained by effecting a matrix algebraic operation equivalent to this sequence of operations, on the discrete cosine transform coefficients y1 to y8. The matrix [FSI] obtained by calculation using addition theorem is given as follows:

equation 1:

$$[FS^I] = \frac{1}{\sqrt{2}} \begin{bmatrix} A & B & D & -E & F & G & H & I \\ A & -C & -D & E & -F & -G & -H & -J \\ A & C & -D & -E & -F & G & -H & J \\ A & -B & D & E & F & -G & H & -I \end{bmatrix} \quad (1)$$

A to J in the equation (1) are as follows:

equation 2:

$$A = \frac{1}{\sqrt{2}}$$

$$B = \frac{\cos\left(\frac{\pi}{16}\right) + \cos\left(\frac{3\pi}{16}\right) + 3\cos\left(\frac{5\pi}{16}\right) - \cos\left(\frac{7\pi}{16}\right)}{4}$$

$$D = \frac{\cos\left(\frac{\pi}{16}\right) - 3\cos\left(\frac{3\pi}{16}\right) - \cos\left(\frac{5\pi}{16}\right) - \cos\left(\frac{7\pi}{16}\right)}{4}$$

$$D = \frac{1}{4}$$

$$E = \frac{\cos\left(\frac{\pi}{16}\right) - \cos\left(\frac{3\pi}{16}\right) - \cos\left(\frac{5\pi}{16}\right) - \cos\left(\frac{7\pi}{16}\right)}{4}$$

$$F = \frac{\cos\left(\frac{\pi}{8}\right) + \cos\left(\frac{3\pi}{8}\right)}{2}$$

$$G = \frac{\cos\left(\frac{\pi}{16}\right) - \cos\left(\frac{3\pi}{16}\right) + \cos\left(\frac{5\pi}{16}\right) + \cos\left(\frac{7\pi}{16}\right)}{4}$$

$$H = \frac{1}{4} + \frac{1}{2\sqrt{2}}$$

$$I = \frac{\cos\left(\frac{\pi}{16}\right) - \cos\left(\frac{3\pi}{16}\right) + 3\cos\left(\frac{5\pi}{16}\right) + \cos\left(\frac{7\pi}{16}\right)}{4}$$

$$J = \frac{\cos\left(\frac{\pi}{16}\right) + 3\cos\left(\frac{3\pi}{16}\right) - \cos\left(\frac{5\pi}{16}\right) - \cos\left(\frac{7\pi}{16}\right)}{4}$$

The operations of the compression inverse discrete-cosine transform (4×4) section 105 and compression inverse discrete-cosine transform (field separation) section 106 can be carried out by applying a fast algorithm. An example of a fast algorithm is the Wang algorithm (see Zhong de Wang, "Fast Algorithms for the Discrete W Transform and for the Discrete Fourier Transform," IEEE Tr. ASSP-32, No. 4, pp. 803–816, August 1984).

The matrix representing the compression discrete cosine transform (4×4) that the section 105 performs can be decomposed as shown below, by applying the Wang algorithm:

equation 3:

$$[C_4^{II}]^{-1} = \begin{bmatrix} 1 & 0 & 0 & 1 \\ 0 & 1 & 1 & 0 \\ 0 & 1 & -1 & 0 \\ 1 & 0 & 0 & -1 \end{bmatrix} \cdot \begin{bmatrix} [C_2^{III}] & \\ & [\overline{C_2^{III}}] \end{bmatrix} \cdot \begin{bmatrix} 1000 \\ 0010 \\ 0001 \\ 0100 \end{bmatrix} \quad (2)$$

The matrix $[C^{III}_2]$ in the equation (2) is expressed as follows:

equation 4:

$$[C^{III}_2] = [C^{II}_2]^T = \frac{1}{\sqrt{2}} \begin{bmatrix} 1 & 1 \\ 1 & -1 \end{bmatrix}$$

equation 5:

$$[\overline{C^{III}_2}] = \begin{bmatrix} -C_{\frac{1}{8}} & C_{\frac{3}{8}} \\ C_{\frac{3}{8}} & C_{\frac{1}{8}} \end{bmatrix}$$

$$= \begin{bmatrix} 1 & 0 & -1 \\ 0 & 1 & 1 \end{bmatrix} \cdot \begin{bmatrix} -C_{\frac{1}{8}} + C_{\frac{3}{8}} & 0 & 0 \\ 0 & C_{\frac{1}{8}} + C_{\frac{3}{8}} & 0 \\ 0 & 0 & C_{\frac{3}{8}} \end{bmatrix} \cdot \begin{bmatrix} 1 & 0 \\ 0 & 1 \\ 1 & -1 \end{bmatrix}$$

In these equations, $C_r = \cos(r\delta)$.

FIG. 6 illustrates how the compression inverse discrete-cosine transform (4×4) section 105 performs a 4×4 compression inverse discrete-cosine transform by using the above-mentioned Wang algorithm.

As shown in FIG. 6, an adder 121 adds coefficients F(0) and F(2) (i.e., two of lower, fourth-order coefficients F(0) to F(3)), and an adder 122 adds an inverted coefficient F(2) to coefficient F(0), thereby performing subtraction. A multiplier 123 multiplies the output of the adder 121 by a coefficient A (=½). The product obtained by the multiplier 123 is supplied to adders 133 and 134. Meanwhile, a multiplier 124 multiplies the output of the adder 122 by the coefficient A. The product obtained by the multiplier 124 is supplied to adders 131 and 132.

An adder 125 adds an inverted coefficient F(1) to the coefficient F(3), thereby effecting subtraction. A multiplier 128 multiplies the output of the adder 125 by a coefficient D (=C₃⁄₈). The product obtained by the multiplier 128 is supplied to an adder 130, and is inverted and then supplied to an adder 129.

A multiplier 126 multiplies the coefficient F(3) by a coefficient B (=$C_{1/8}+C_{3/8}$). The product obtained by the multiplier 126 is supplied to the adder 129. A multiplier 127 multiplies the coefficient F(1) by a coefficient C (=$C_{1/8}+C_{3/8}$). The product obtained by the multiplier 127 is supplied to the adder 130.

The adder 129 adds the inverted output of the adder 128 to the output of the multiplier 126, thus performing subtraction. The adder 130 adds the outputs of the multipliers 127 and 128. The output of the adder 129 is supplied to the adder 131, and is inverted and then supplied to the adder 132. Meanwhile, the output of the adder 130 is supplied to the adder 133, and is inverted and then supplied to the adder 134.

The adder 131 adds the output of the multiplier 124 and the output of the adder 129. The adder 132 adds the output of the multiplier 124 and the inverted output of the adder 129, effecting subtraction. The adder 133 adds the output of the multiplier 123 and the output of the adder 130. The adder 134 adds the output of the multiplier 123 and the inverted output of the adder 130, thereby performing subtraction.

The output of the adder 133 is a coefficient f(0) that has been generated by fourth-order inverse discrete cosine transform. Similarly, the output of the adder 131 is a coefficient f(1), the output of the adder 132 is a coefficient f(2), and the output of the adder 134 is a coefficient f(3).

That is, nine adders and five multipliers cooperate in the section 105 and accomplish a 4×4 inverse discrete-cosine transform. The value $C_{3/8}$ is given as follows:

$$C_{3/8} = \cos(3\delta/8)$$

The matrix representing the compression inverse discrete-cosine transform (field separation) performed in the section 106 can be decomposed by using the Wang algorithm, as shown in the following equation (3). In the equation (3), A to J at the multipliers are of the same meaning as in the equation (1).

Equation 6:

$$[FS^1] = \begin{bmatrix} 1 & 0 & 0 & 0 \\ 0 & 0 & 0 & 1 \\ 0 & 1 & 0 & 0 \\ 0 & 0 & 1 & 0 \end{bmatrix} \cdot \begin{bmatrix} 1 & 0 & 1 & 0 \\ 0 & 1 & 0 & 1 \\ 1 & 0 & -1 & 0 \\ 0 & 1 & 0 & -1 \end{bmatrix} \cdot \begin{bmatrix} [M_1] & \\ & [M_2] \end{bmatrix} \cdot \begin{bmatrix} 10000000 \\ 00100000 \\ 00001000 \\ 00000010 \\ 00010000 \\ 00000100 \\ 01000000 \\ 00000001 \end{bmatrix}$$ (3)

The matrices $[M_1]$ and $[M_2]$ in the equation (3) are expressed as follows:

Equation 7:

$$[M_1] = \begin{bmatrix} 1 & 1 \\ 1 & -1 \end{bmatrix} \cdot \begin{bmatrix} 1 & 0 & 0 & 0 \\ 0 & 1 & 1 & 1 \end{bmatrix} \cdot \begin{bmatrix} A000 \\ 0D00 \\ 00F0 \\ 000H \end{bmatrix}$$

Equation 8:

$$[M_2] = \begin{bmatrix} 110 \\ 101 \end{bmatrix} \cdot \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \cdot \begin{bmatrix} E000 \\ 0G00 \\ 00B0 \\ 00C0 \\ 000I \\ 000J \end{bmatrix}$$

FIG. 7 illustrates how the compression inverse discrete-cosine transform (field separation) section 106 carries out compression inverse discrete-cosine transform of field separation type, by using the Wang algorithm.

As shown in FIG. 7, a multiplier 141 multiplies a coefficient F(0), i.e., one of eighth-order coefficients F(0) to F(7), by the coefficient A described in the equation (1). A multiplier 142 multiplies a coefficient F(2) by the coefficient D also described in the equation (1). A multiplier 143 multiplies a coefficient F(4) by the coefficient F described in the equation (1). A multiplier 144 multiplies a coefficient F(6) by the coefficient H described in the equation (1). A multiplier 145 multiplies a coefficient F(3) by the coefficient E described in the equation (1). A multiplier 146 multiplies a coefficient F(5) by the coefficient G described in the equation (1). A multiplier 147 multiplies a coefficient F(1) by the coefficient B described in the equation (1). A multiplier 148 multiplies a coefficient F(1) by the coefficient C described in the equation (1). A multiplier 149 multiplies a coefficient F(7) by the coefficient I described in the equation (1). A multiplier 150 multiplies a coefficient F(7) by the coefficient J described in the equation (1).

The output of the multiplier 141 is input to adders 156 and 157. The output of the multiplier 142 is input to an adder 151. The output of the multiplier 143 is input to the adder 151, too. The output of the multiplier 143 is input to the adder 151. The output of the multiplier 144 is input to an adder 152. The output of the multiplier 145 is input to an adder 153. The output of the multiplier 146 is inverted and then input to the adder 153. The output of the multiplier 147 is input to an adder 154. The output of the multiplier 148 is input to an adder 155. The output of the multiplier 149 is input to the adder 154. The output of the multiplier 150 is input to the adder 155.

The adder 151 adds the outputs of the multipliers 142 and 143. The adder 152 adds the output of the adder 151 and the output of the multiplier 144. The adder 153 adds the output of the multiplier 145 and the inverted output of the multiplier 146, thus carrying out subtraction. The adder 154 adds the outputs of the multipliers 147 and 149. The adder 155 adds the outputs of the adders 148 and 150.

The adder 156 adds the output of the multiplier 141 and the output of the adder 152. The adder 157 adds the output of the multiplier 141 and the output of the adder 152. An adder 158 adds the outputs of the adders 153 and 154. An adder 159 adds the outputs of the adders 153 and 155.

An adder 160 adds the outputs of the adders 156 and 158. An adder 161 adds the outputs of the adders 156 and 158. An adder 162 adds the outputs of the adders 157 and 159. An adder 163 adds the outputs of the adders 157 and 159.

The output of the adder 160 is a coefficient f(0) that has been subjected to inverse discrete cosine transform of field separation type. The output of the adder 162 is a similar coefficient f(2), the output of the adder 161 is a similar coefficient f(3), and the output of the adder 163 is a similar coefficient f(1).

As has been described with reference to FIG. 7, the section 106 accomplishes compression inverse discrete-cosine transform of field separation type, by using thirteen adders and ten multipliers.

Motion-compensating devices that operate in a field-motion compensation mode and a frame-motion compensation mode, respectively, will be described. In both compensation modes, a twofold interpolation filter, such as a half-band filter, generates a ½-precision pixel and a ¼-precision pixel is generated from the ½-precision pixel by means of linear interpolation, thus achieving interpolation in horizontal direction. In this process, a half-band filter may be used to output, as a predicted value, a pixel that has the same phase as the pixel read from a frame memory. If this is the case, it is unnecessary to repeat multiplication and addition as many times as the number of taps that are provided. This helps achieve a high-speed operation. The use of the half-band filter renders it possible to accomplish the division in the process of interpolation, by means of shift operation. The speed of operation can therefore increase further. Alternatively, filtering of fourfold interpolation may be performed, thereby to generate pixels that are required to achieve motion compensation.

The operating principles of the motion-compensating (field prediction) sections 108 and 109 will be explained below.

In the section 108 (field prediction) and the section 109 (frame prediction), a twofold interpolation filter, such as a half-band filter, generates a ½-precision pixel and a ¼-precision pixel is generated from the ½-precision pixel by means of linear interpolation, thus achieving interpolation in horizontal direction. In this case, a half-band filter may be used to output, as a predicted value, a pixel that has the same phase as the pixel read from the frame memory 110. If so, multiplication or addition need not be repeated as many times as the number of taps that are provided. This helps achieve a high-speed operation. The use of the half-band filter makes it possible to accomplish the division in the process of interpolation, by means of shift operation. The speed of operation can therefore increase further. Alternatively, filtering of fourfold interpolation may be performed, thereby to generate pixels that are required to achieve motion compensation.

FIGS. 8A, 8B and 8C are diagrams which explain how the motion-compensating sections (field prediction) 108 performs interpolation in vertical direction. First, as shown in FIG. 8A, the section 108 reads pixel values ga that have a phase difference between fields, from the video memory 110, in accordance with the vector value contained in the input compressed image data (bit stream). Then, as shown in FIG. 8B, a twofold interpolation filter generates a ½-precision pixel gb in each field. As shown in FIG. 8C, the motion-compensating sections (field prediction) 108 carries out intra-field linear interpolation, thereby generating a ¼-precision pixel gc. A half-band filter may be used as the twofold interpolation filter and may output pixel values of the same phase as those read from video memory 110, which represent a predicted image. In this case, multiplication or addition need not be repeated as many times as the number of taps that are provided. This achieves a high-speed operation. Alternatively, filtering of fourfold interpolation may be effected, thereby to generate pixel values similar to the ones shown in FIG. 8C, from pixel values ga illustrated in FIG. 8A FIGS. 9A, 9B and 9C are diagrams which explain how the motion-compensating sections (frame prediction) 109 performs interpolation in vertical direction. First, as shown in FIG. 9A, the section 109 reads pixel values ga that have a phase difference between fields, from the video memory 110, in accordance with the vector value contained in the input compressed image data (bit stream). Then, as shown in FIG. 9B, a twofold interpolation filter generates a ½-precision pixel gb in each field. As shown in FIG. 9C, the motion-compensating sections (frame prediction) 109 performs inter-field linear interpolation, thereby generating a ¼-precision pixel gc. The interpolation prevents inversion of fields and mixing of fields that may deteriorate image quality. A half-band filter may be is used as the twofold interpolation filter and may output pixel values of the same phase as those read from video memory 110, which represent a predicted image. In this case, multiplication or addition need not be repeated as many times as the number of taps that are provided. This achieves a high-speed operation.

In practice, coefficients are prepared and applied, so that the two-step interpolation, which consists in using a twofold interpolation filter and performing linear interpolation, may be accomplished in a single step in both the horizontal direction and the vertical direction. Only necessary pixel values are generated in both the horizontal interpolation and the vertical interpolation, in accordance with the motion vectors contained in the input compressed image data (bit stream). Filter coefficients that correspond to the horizontal and vertical motion vectors may be prepared. In this case, the horizontal interpolation and the vertical interpolation can be carried out at a time.

To effect twofold interpolation filtering, it may be necessary, depending on the values of motion vectors, to refer to the data stored in video memory 110 and existing outside the image frame. If so, a row of pixels is folded at the end point, for the number of taps required, as is illustrated in FIG. 10A. This process shall be called "mirror process." Alternatively, pixels identical in value to the pixel at the end point may be provided outside the image frame in the same number as the taps required, as is illustrated in FIG. 10B. The alternative process shall be called "hold process." Either the mirror process or the hold process is carried out in units of fields to achieve vertical interpolation in both the motion-compensating sections (field prediction) 108 and the motion-compensating sections (frame prediction) 109.

The operating principle of the frame-converting section 111 will be described below.

If the image represented by the compressed image data (bit stream) input consists of 1920×1080 pixels, the image data output from the video memory 110 is composed of 960×1080 pixels. In order to output the image data to, for example, a display apparatus for displaying a 720×480 pixel image (aspect ratio of 16:9), pixel data items must be extracted to reduce the number of pixels to ¾ in the horizontal direction and to ⅘ in the vertical direction. The frame-converting section 111 extracts pixel data items in this manner, thereby to change the size of the image frame.

The MPEG2 data-encoding system described above can process high-quality image codes that are suitable for broadcasting, but cannot process a smaller amount (bit rate) of image data than MPEG1 image data. In other words, the MPEG2 data-encoding system cannot process image codes that are compressed at higher ratios. More and more image codes compressed at higher ratios will be used because mobile telephones are now used in increasing numbers. To cope with this situation, the MPEG4 data-encoding system has been standardized. The standards of the MPEG4 data-encoding system was approved internationally in December 1998, as ISO/IEC 14496-2.

It is demanded that the MPEG2-image compressed data (bit stream) encode for use in the digital broadcasting be converted to MPEG4-image compressed data (bit stream) of a smaller amount (bit rate) that can be readily processed in mobile terminals and the like.

To meet this demand, an image data converting apparatus (known as "transcoder") has been proposed. FIG. 11 illustrates such an apparatus described in "Field-to-Frame Transcoding with Spatial and Temporal Downsampling" (Susie J. Wee, John G. Apostolopoulos, and Nick Feamster, ICIP '99).

As shown in FIG. 11, the frame data items contained in MPEG2-image compressed data (bit stream), i.e., interlaced-scan image data, is input to the picture-type determining section 112.

The picture-type determining section 112 determines whether the each frame data item pertains to an I/P (intra-image encoded image/forward prediction encoded image) or a B picture (bi-directional prediction encoded image). If the frame data item pertains to an I/P picture, the section 112 outputs the data about the I/P picture to the MPEG2-image decoding section (I/P picture) 113.

The MPEG2-image decoding section (I/P picture) 113 performs the same process as does the ordinary MPEG2-image decoding apparatus. However, the section 113 needs to decode the I/P picture only. This is because the picture-type determining section 112 has discarded the data about the B picture. The pixel value, i.e., the output of the picture-type determining section 112, is input to the data-extracting section 114.

The data-extracting section 114 carries out ½ extraction in the horizontal direction. In the vertical direction, the section 114 extracts the first field or the second field, preserving one of these two fields, thereby generating sequential-scan image data. The sequential-scan image data has a ¼ size with respect to the image data input to the picture-type determining section 112. The sequential-scan image data generated by the data-extracting section 114 is input to the MPEG4-image encoding section (I/P-VOP) 115.

The MPEG4-image encoding section (I/P-VOP) 115 encodes the signals constituting the sequential-scan image data input to it, thus generating MPEG4-image compressed data (bit stream).

The MPEG2-image compressed data (bit stream) is supplied from the MPEG2-image decoding section 113 to the motion-vector synthesizing section 116. The section 116 performs mapping on the motion vector contained in the MPEG2-image compressed data, thereby synthesizing a motion vector for the image data some part of which has been extracted by the data-extracting section 114. The motion vector, thus generated, is supplied to the motion-vector detecting section 117. The section 117 detects a high-precision motion vector from the motion vector synthesized by the motion-vector synthesizing section 116.

In MPEG4-image data, VOP (Video Object Plane) represents a region that is composed of one or more macro blocks that surround an object. The VOP region is classified into any one of an I picture, a P picture and a B picture, depending on the encoding scheme employed. An I-VOP (i.e., VOP of I picture), or an image (region), is encoded (by means of intra-encoding), without being subjected to motion compensation. A P-VOP (i.e., VOP of P picture) is encoded by means of forward prediction encoding, on the basis of the image (either an I picture or a P-VOP) that precedes in time. A B-VOP (i.e., VOP of B picture) is encoded by means of bidirectional prediction encoding, on the basis of two images (I pictures or P-VOPs) that follows in time.

Thus, the image data converting apparatus shown in FIG. 11 can convert MPEG2-image compressed data (bit stream) to MPEG4-image compressed data (bit stream).

In the image data converting apparatus of FIG. 11, however, the MPEG2-image decoding section (I/P picture) 113 must process a great amount of data. The video memory 110 should therefore have a large storage capacity. Inevitably, it is difficult to provide an inexpensive apparatus if only dedicated LSIs are used. The apparatus may comprise general-purpose processors. In this case, the apparatus may fail to operate in real time.

BRIEF SUMMARY OF THE INVENTION

The present invention has been made in consideration of the foregoing. The object of the invention is to provide an apparatus and method that can convert, at low cost and in real time, interlaced-scan MPEG2-image compressed data (bit stream) to sequential-scan MPEG4-image compressed data (bit stream).

An image data converting apparatus according to the invention is designed to convert first compressed image data to second compressed image data more compressed than the first compressed image data. The first compressed image data is interlaced-scan data that has been compressed by orthogonal transform and motion compensation, and the second compressed data is serial-scan data. The apparatus comprises: image data decoding means for decoding the first compressed image data by using only lower mth-order orthogonal transform coefficients included in nth-order orthogonal transform coefficients (where m<n), in both a vertical direction and a horizontal direction in the first compressed image data; scan-converting means for converting interlaced-scan data output from the image data decoding means to serial-scan data; and the second image data encoding means for encoding the serial-scan data, thereby generating the second compressed image data.

In the image data converting apparatus, the first compressed image data is MPEG2-image compressed data containing eighth-order discrete cosine transform coefficients in both the vertical direction and the horizontal direction. The image data decoding means is MPEG2-image data decoding means for decoding the MPEG2-image compressed data in both the vertical direction and the horizontal direction, by using only lower fourth-order coefficients included in eighth-order discrete cosine transform coefficients. The image data encoding means is MPEG4-image encoding means for encoding the serial-scan data, thereby generating MPEG4-image compressed data.

An image data converting method according to the invention is designed to convert first compressed image data to second compressed image data more compressed than the first compressed image data. The first compressed image data is interlaced-scan data that has been compressed by orthogonal transform and motion compensation. The second compressed data is serial-scan data. The method comprises the steps of: decoding the first compressed image data by using only lower mth-order orthogonal transform coefficients included in nth-order orthogonal transform coefficients (where m<n), in both a vertical direction and a horizontal direction in the first compressed image data; converting interlaced-scan data output from the image data decoding means to serial-scan data; and encoding the serial-scan data, thereby generating the second compressed image data.

In the image data converting method, the first compressed image data is MPEG2-image compressed data containing eighth-order discrete cosine transform coefficients in both the vertical direction and the horizontal direction. The step of the decoding the first compressed image data is to decode the MPEG2-image compressed data in both the vertical direction and the horizontal direction, by using only lower fourth-order coefficients included in eighth-order discrete cosine transform coefficients. The step of encoding the serial-scan data is to encode the serial-scan data, thereby generating MPEG4-image compressed data.

In the image converting apparatus and method according to the invention, the picture type of each frame data contained in the interlaced-scan MPEG4-picture compressed data is determined. In accordance with the picture type determined, only the frame data about an intra-image encoded image/forward prediction encoded image is output, while discarding the frame data about a bi-directional prediction encoded image, thereby converting the frame rate.

In other words, outputs only the frame data about I/P pictures, contained in the input MPEG4-picture compressed data (bit stream), is output, while the frame data about B pictures, thereby converting the frame rate. Part of the data about the I/P pictures is then decoded in both the horizontal direction and the vertical direction, by using only the fourth-order coefficients included in the eighth-order DCT coefficients. Thereafter, of the pixel values to be output as decoded MPEG2-image compressed data, only the data of the first field or the second field is preserved, and the data of the other of these two fields is discarded. Further, twofold interpolation is performed, thereby converting the data to serial-scan data. The serial-scan data is encoded, generating MPEG4-image compressed data (bit stream). Moreover, mapping is performed on the motion vector contained in the serial-scan image data, on the basis of the motion vector contained in the input compressed image data (bit stream). Furthermore, a high-precision motion vector is detected from the motion vector subjected to the mapping.

According to the present invention, the first compressed image data is decoded by using only lower mth-order orthogonal transform coefficients included in nth-order orthogonal transform coefficients (where m<n), in both a vertical direction and a horizontal direction in the first compressed image data. Then, interlaced-scan data is converted to serial-scan data. Further, the second compressed image data is generated from the serial-scan data. Hence, interlaced-scan MPEG2-image compressed data (bit stream) can be converted to sequential-scan MPEG4-image compressed data (bit stream) at low cost and in real time, by processing a small amount of data and using a video memory of small storage capacity.

BRIEF DESCRIPTION OF THE SEVERAL VIEWS OF THE DRAWINGS

FIGS. 2A and 2B are diagrams explaining the two operating principles the variable-length decoding section provided in the apparatus of FIG. 1 assumes to decode MPEG2-image compressed data generated by zigzag scanning;

FIGS. 3A and 3B are diagrams explaining two operating principles the variable-length decoding section provided in the apparatus of FIG. 1 assumes to decode MPEG2-image compressed data generated by alternate scanning;

FIGS. 8A, 8B and 8C are diagrams explaining the operating principle of the motion-compensating section (field prediction) that is incorporated in the apparatus of FIG. 1;

FIGS. 9A, 9B and 9C are diagrams explaining the operation principle of the motion-compensating section (frame prediction) that is provided in the apparatus of FIG. 1;

FIGS. 10A and 10B are diagrams explaining the mirror process and hold process that are performed by the motion-compensating section (field prediction) and motion-compensating section (frame prediction), both provided in the apparatus of FIG. 1;

DETAILED DESCRIPTION OF THE INVENTION

A preferred embodiment of the present invention will be described, with reference to the accompanying drawings.

Figure 12:
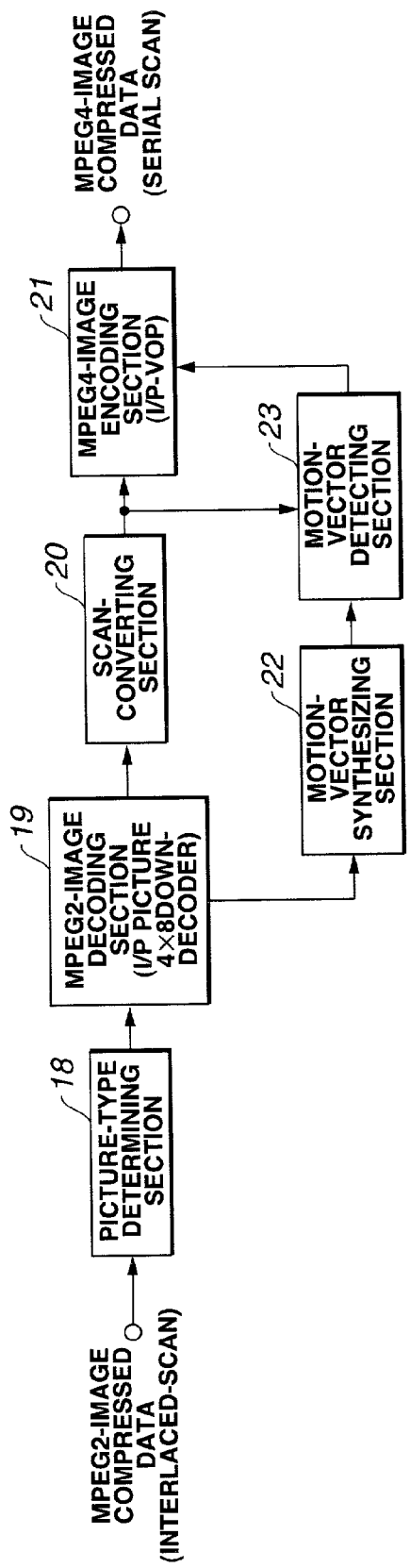
FIG. 12 is a block diagram schematically showing an image data converting apparatus that is an embodiment of the present invention.

FIG. 12 is a schematic representation of an image data converting apparatus according to the invention.

As shown in FIG. 12, the frame data items contained in MPEG2-image compressed data (bit stream), i.e., interlaced-scan image data, is input the picture-type determining section 18.

The picture-type determining section 18 supplies the data about an I/P picture to the MPEG2-image data decoding section (i.e., I/P picture 4×8 down-decoder) 19, but discards the data about a B picture. Thus, the section 18 converts the frame rate.

Figure 1:
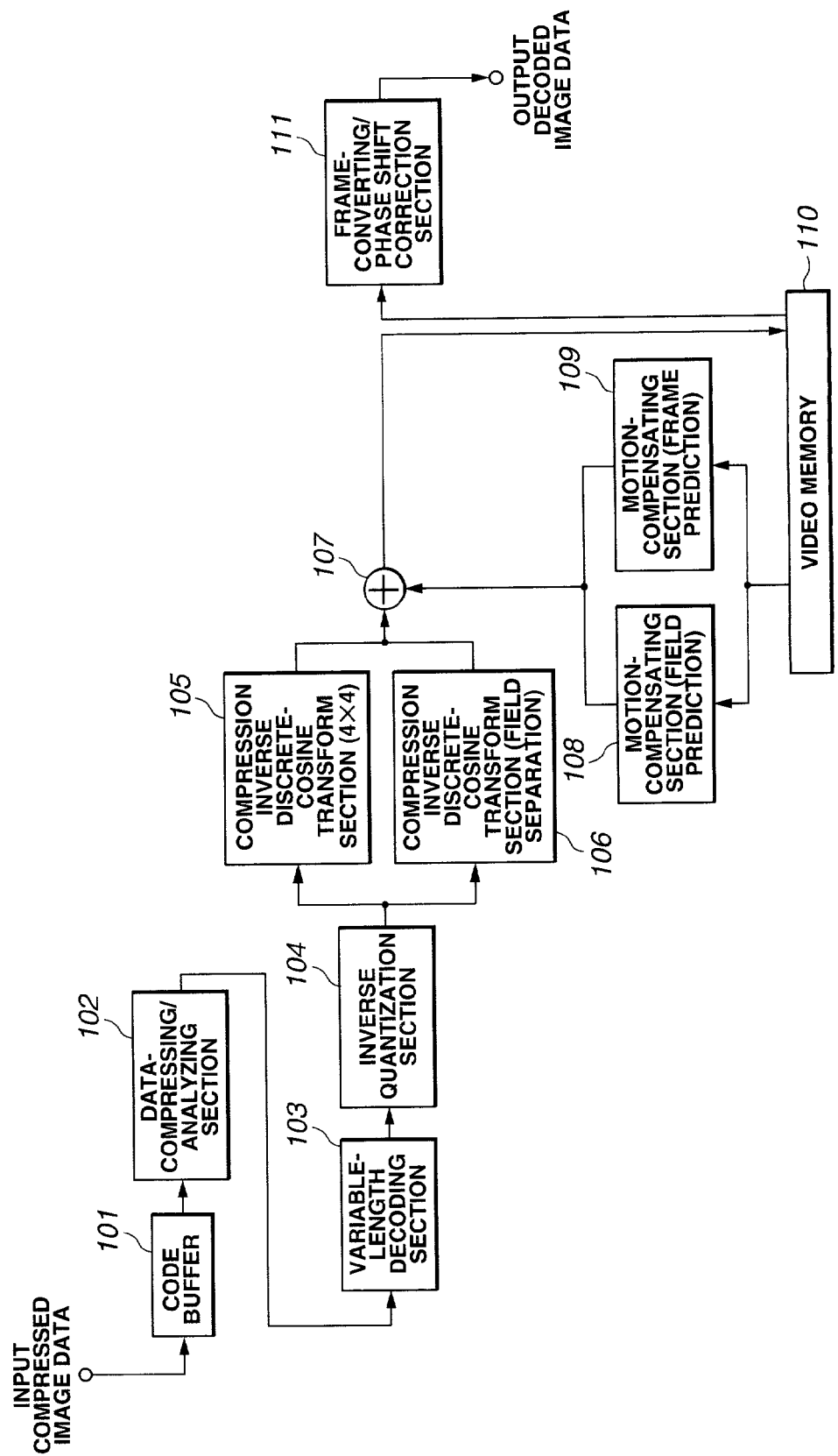
FIG. 1 is a block diagram showing an image data decoding apparatus (i.e., 4×4 down decoder) that decodes data by using only fourth-order lower data in both the vertical direction and the horizontal direction.
Figures 4A, 4B:
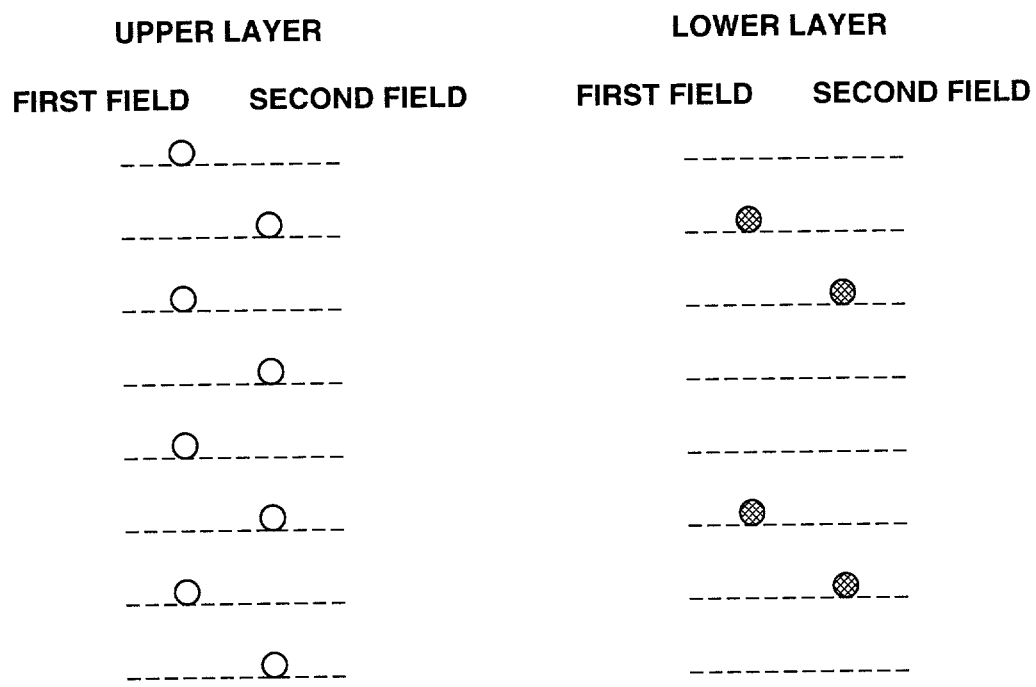
FIGS. 4A and 4B are diagrams explaining the phases of the pixel values stored in the video memory that is incorporated in the apparatus of FIG. 1.
Figure 5:
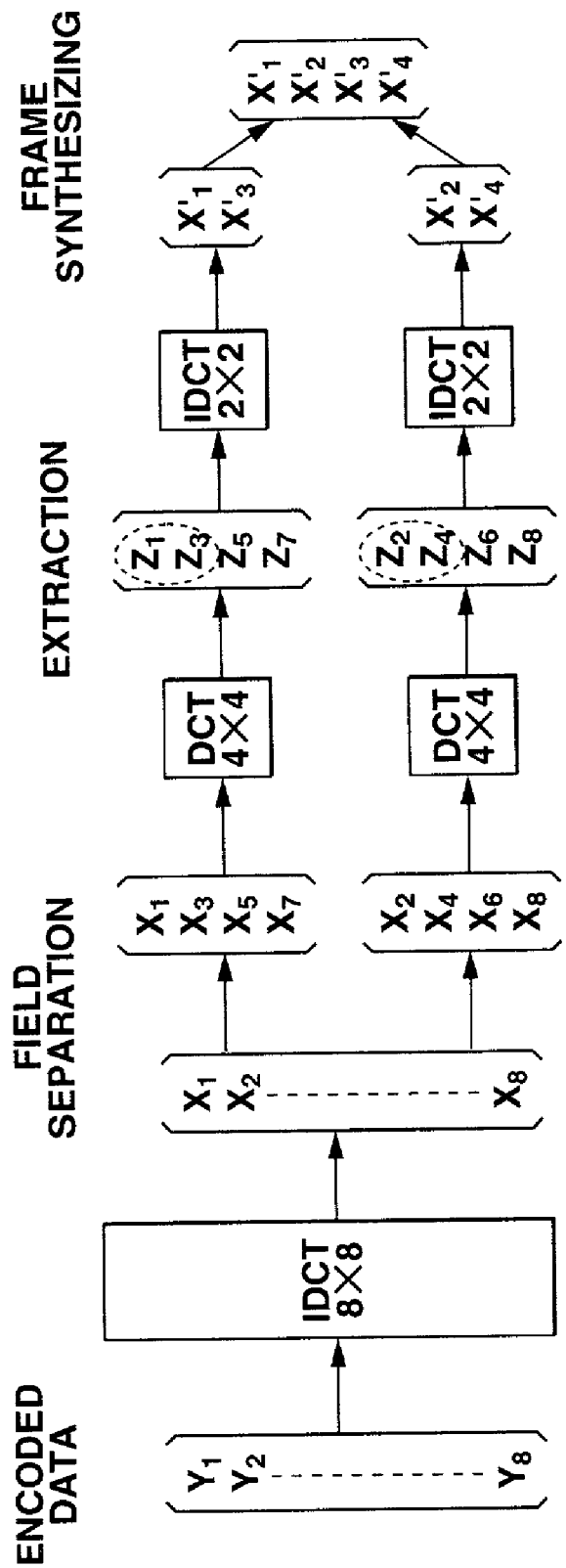
FIG. 5 is a diagram explaining the operating principle of the compression inverse discrete-cosine transform section (field separation) provided in the apparatus of FIG. 1.
Figure 6:
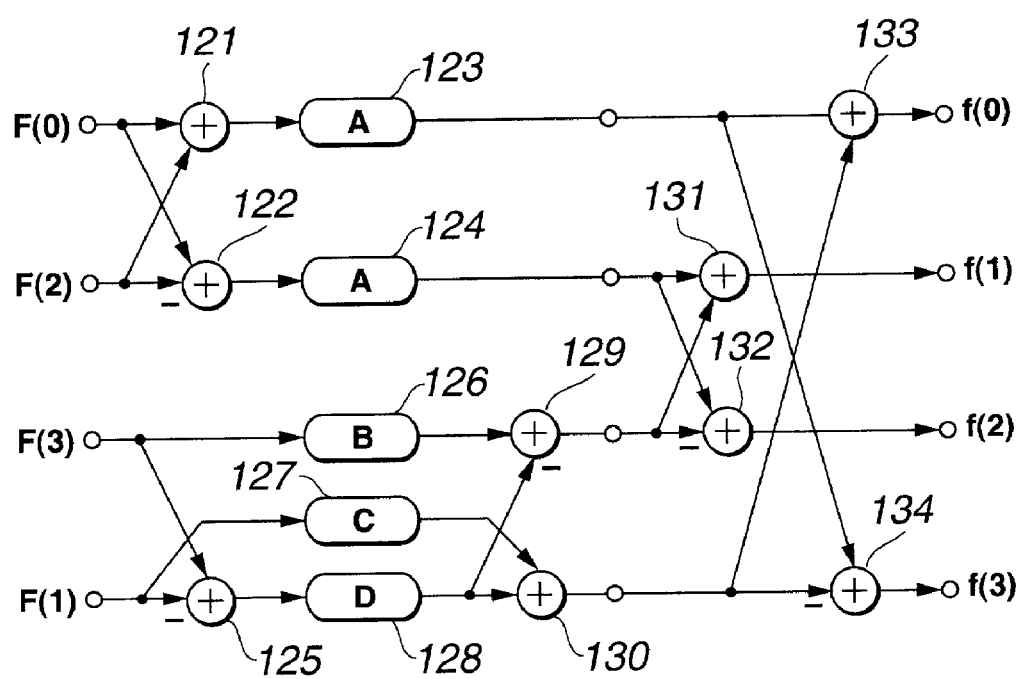
FIG. 6 is a diagram illustrating how the compression inverse discrete-cosine transform (4×4) section used in the apparatus of FIG. 1 performs its function by using a fast algorithm.
Figure 7:
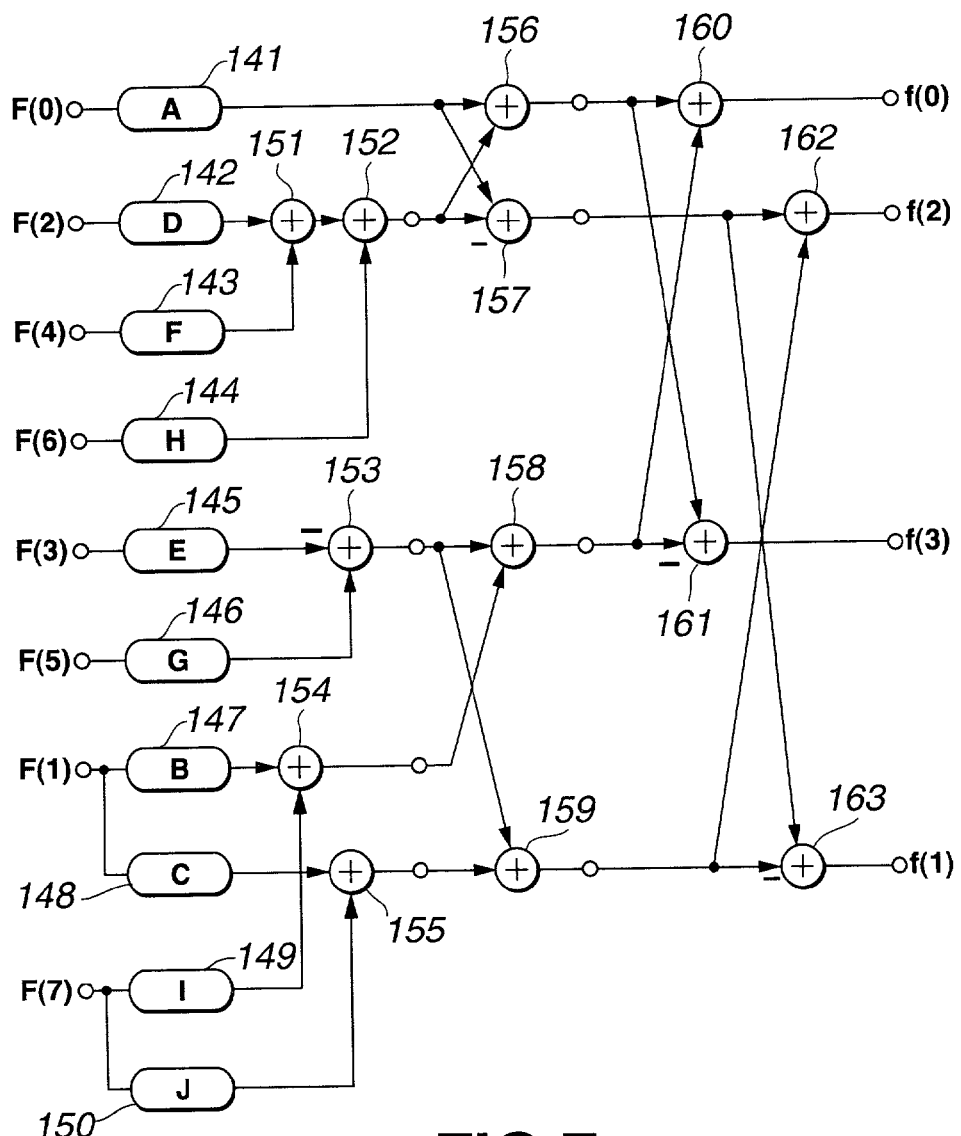
FIG. 7 is a diagram illustrating how the compression inverse discrete-cosine transform (field separation) section provided in the apparatus of FIG. 1 performs its function by using a fast algorithm.
Figure 11:
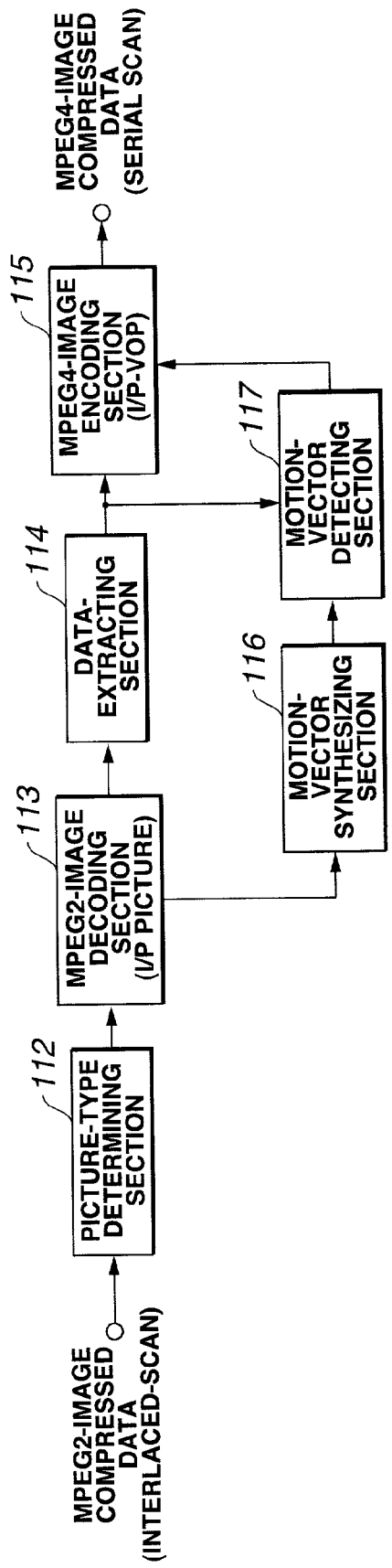
FIG. 11 is a block diagram showing an image data converting apparatus (transcoder) that receives MPEG2-image compressed data (bit stream) and outputs MPEG4-image compressed data (bit stream)
Figure 13:
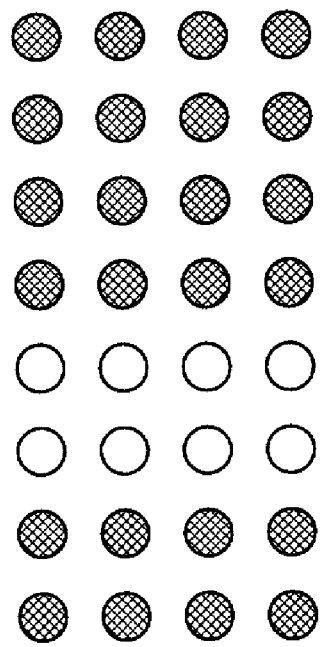
FIG. 13 is a diagram explaining how the amount of data processed is decreased in the apparatus of FIG. 12 when the input compressed image data (bit stream) contains a macro block of frame DCT mode.

The MPEG2-image data decoding section 19 performs the same process as does the apparatus shown in FIG. 1. However, the section 19 only needs to decode the I/P picture. This is because the picture-type determining section 18 already discarded the data about the B picture. The MPEG2-image data decoding section 19 only needs to decode data by using only fourth-order lower data (DCT coefficients) in both the vertical direction and the horizontal direction, as in the image data decoding apparatus shown in FIG. 1. Hence, it suffices for the video memory for storing the data the section 19 processes to have only one fourth of the storage capacity required in the image data converting apparatus of FIG. 11, which comprises the MPEG2-image decoding section (I/P picture) 113. Further, the amount of data processed to achieve inverse discrete cosine transform decreases to a quarter (¼) in the field DCT mode, and to half (½) in the frame DCT mode. Moreover, in the frame DCT mode, some of the (4×8)th-order discrete cosine transform coefficients may be replaced by 0s as shown in FIG. 13. If this case, the amount of data to be processed can be reduced, causing virtually no deterioration of image quality.

Figure 14A:
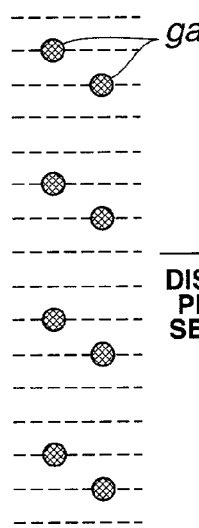
FIGS. 14A, 14B and 14C are diagrams explaining the operating principle of the scan-converting section incorporated in the image data converting apparatus of FIG. 12.
Figure 14B:
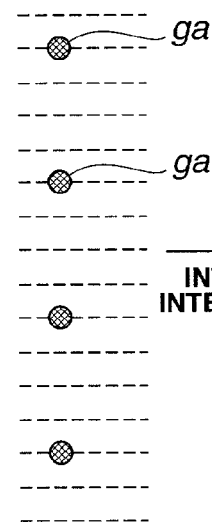
Figure 14C:
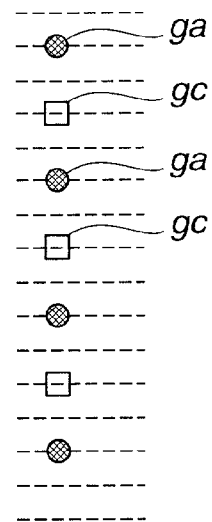

The output of the MPEG2-image data decoding section (i.e., I/P picture 4×4 down-decoder) 19, or interlaced-scan pixel data, is input to the scan-converting section 20. The scan-converting section 20 preserves one of two fields and discards the other of the two fields. The section 20 then performs twofold interpolation in the field preserved, thereby converting the interlaced-scan pixel data to sequential-scan pixel data as is illustrated in FIGS. 14A, 14B and 14C. More specifically, the section 20 preserves only the pixels ga of the first field are preserved, while discarding the pixel values .of the second field, as is shown in FIGS. 14A and 14B. Next, the scan-converting section 20 carries out twofold interpolation in the first field (i.e., preserved field) as illustrated in FIG. 14C, thereby generating interpolated pixels gc. Thus, the scan-converting section 20 converts the interlaced-scan pixel data to sequential-scan pixel data. The section 20 outputs the sequential-scan pixel data.

The sequential-scan pixel data is supplied to the MPEG4-image encoding section (I/P-VOP) 21. The MPEG4-image encoding section (I/P-VOP) 21 encodes the signals constituting the sequential-scan pixel data input to it, thus generating MPEG4-image compressed data (bit stream).

The motion vector data contained in the MPEG2-image compressed data (bit stream) input, which has been detected by the MPEG2-image data decoding section (i.e., I/P picture 4×4 down-decoder), is input to the motion-vector synthesizing section 22. The section 22 performs mapping on the motion vector data, thereby synthesizing a motion vector value for the converted serial-scan image. The motion vector value is supplied to the motion-vector detecting section 23. The section 23 detects a high-precision motion vector from the motion vector value in the converted serial-scan image.

As has been described, the image data converting apparatus according to the present invention decodes the interlaced-scan MPEG2-image compressed data by using only fourth-order lower data in both the vertical direction and the horizontal direction. The apparatus then converts the interlaced-scan data to serial-scan data, thereby generating MPEG4-image compressed data. Thus, the apparatus can convert, at low cost and in real time, interlaced-scan MPEG2-image compressed data (bit stream) to sequential-scan MPEG4-image compressed data (bit stream).

As described above, the data input to the image data converting apparatus of the invention is MPEG2-image compressed data (bit stream), and the data output from the apparatus is MPEG4-image compressed data (bit stream). The input and output are not limited to these, nonetheless. For example, the input may be MPEG1-image compressed data (bit stream) or H.263 compressed image data (bit stream). The apparatus according to this invention can converts these types of compressed data, too, at low cost and in real time.

What is claimed is:

1. An image data converting apparatus for converting first compressed image data to second compressed image data being more compressed than the first compressed image data, said first compressed image data being interlaced-scan data compressed by orthogonal transform and motion compensation, and said second compressed data being serial-scan data, said apparatus comprising:

image data decoding means for decoding the first compressed image data by using only lower mth-order orthogonal transform coefficients included in nth-order orthogonal transform coefficients (where m<n), in both a vertical direction and a horizontal direction in the first compressed image data;

scan-converting means for converting interlaced-scan data output from the image data decoding means to serial-scan data;

image data encoding means for encoding the serial-scan data, thereby generating the second compressed image data; and wherein the image data decoding means comprises compression inverse discrete-cosine transform means of a frame-discrete cosine transform mode, wherein the compression inverse discrete-cosine transform means of frame-discrete cosine transform mode performs the inverse discrete cosine transform by using a part of coefficients included in (4×8)th-order discrete cosine transform coefficients input to achieve the field-discrete compression inverse discrete cosine transform, while replacing remaining coefficients by 0s, thus discarding the remaining coefficients, and wherein the part of the coefficients included in the (4×8)th-order discrete cosine transform coefficients is only (4×4) and (4×2)th-order coefficients included in (4×8)th-order discrete cosine transform coefficients.

2. The apparatus according to claim 1, wherein the first compressed image data is MPEG2-image compressed data containing eighth-order discrete cosine transform coefficients in both the vertical direction and the horizontal direction, the image data decoding means is MPEG2-image data decoding means for decoding the MPEG2-image compressed data in both the vertical direction and the horizontal direction, by using only lower fourth-order coefficients included in the eighth-order discrete cosine transform coefficients, and the image data encoding means is MPEG4-image encoding means for encoding the serial-scan data from the scan converting means, thereby generating MPEG4-image compressed data.

3. The apparatus according to claim 2, further comprising picture-type determining means for determining a code type of each frame in the interlaced-scan MPEG2-image compressed data, for outputting data about an intra-image encoded image/forward prediction encoded image, and for discarding data about a bi-directional prediction encoded image, thereby to convert a frame rate, wherein an output of the picture-type determining means is input to the MPEG2-image data decoding means.

4. The apparatus according to claim 3, wherein the MPEG2-image data decoding means decodes only the intra-image encoded image/forward prediction encoded image.

5. The apparatus according to claim 2, wherein the MPEG2-image data decoding means comprises variable-length decoding means, and the variable-length decoding means performs variable-length decoding on only discrete cosine transform coefficients required in a discrete cosine transform, in accordance with whether a macro block of the input MPEG2-image compressed data is of a field-discrete cosine transform mode or a frame-discrete cosine transform mode.

6. The apparatus according to claim 2, wherein the MPEG2-image data decoding means comprises compression inverse discrete-cosine transform means of a field-discrete cosine transform mode, the compression inverse discrete-cosine transform means extracts only the lower fourth-order coefficients included in the eighth-order discrete cosine transform coefficients, in both the vertical direction and the horizontal direction, and then performs a fourth-order inverse discrete cosine transform on the lower fourth-order coefficients extracted.

7. The apparatus according to claim 6, wherein the inverse discrete-cosine transform is carried out in both the horizontal direction and the vertical direction by a method based on a predetermined fast algorithm.

8. The apparatus according to claim 1, wherein the inverse discrete-cosine transform is carried out in both the horizontal direction and the vertical direction by a method based on a predetermined fast algorithm.

9. The apparatus according to claim 2, wherein the MPEG2-image data decoding means comprises motion-compensating means, wherein the motion-compensating means performs ¼-precision pixel interpolation in both the horizontal direction and the vertical direction in accordance with a motion vector contained in the input MPEG2-image compressed data.

10. The apparatus according to claim 9, wherein the motion-compensating means initially performs ½-precision pixel interpolation in the horizontal direction by using a twofold interpolation digital filter and then performs the ¼-precision pixel interpolation by means of linear interpolation.

11. The apparatus according to claim 9, wherein the motion-compensating means initially performs ½-precision pixel interpolation in a field, as vertical interpolation by using a twofold interpolation digital filter, and then performs the ¼-precision pixel interpolation in the field by means of linear interpolation, when a macro block of the input MPEG2-image compressed data is of a field prediction mode.

12. The apparatus according to claim 9, wherein the motion-compensating means initially performs ½-precision pixel interpolation in a field, as vertical interpolation by using a twofold interpolation digital filter, and then performs the ¼-precision pixel interpolation in the field by means of linear interpolation, when a macro block of the input MPEG2-image compressed data is of a frame prediction mode.

13. The apparatus according to claim 9, wherein the motion-compensating means includes a half-band digital filter for performing the pixel interpolation in both the horizontal direction and the vertical direction.

14. The apparatus according to claim 9, wherein the MPEG2-image data decoding means further comprises storage means for storing pixel values, and the motion-compensating means calculates coefficients equivalent to a sequence interpolating operation and applies the coefficients, thereby to perform motion compensation on the pixel values read from the storage means in accordance with the motion vector contained in the input MPEG2-image compressed data.

15. The apparatus according to claim 9, wherein, when pixel values outside an image frame are required to achieve twofold interpolation, the motion-compensating means performs one of a mirror process and a hold process, thereby generating a number of virtual pixel values equal to a number of taps provided in a filter in order to accomplish motion compensation, before performing the motion compensation.

16. An image data converting apparatus for converting first compressed image data to second compressed image data being more compressed than the first compressed image data, said first compressed image data being interlaced-scan data compressed by orthogonal transform and motion compensation, and said second compressed data being serial-scan data, said apparatus comprising:

image data decoding means for decoding the first compressed image data by using only lower mth-order orthogonal transform coefficients included in nth-order orthogonal transform coefficients (where m<n), in both a vertical direction and a horizontal direction in the first compressed image data;

scan-converting means for converting interlaced-scan data output from the image data decoding means to serial-scan data;

image data encoding means for encoding the serial-scan data, thereby generating the second compressed image data; and wherein the image data decoding means comprises compression inverse discrete-cosine transform means of a frame-discrete cosine transform mode, wherein the compression inverse discrete-cosine transform means of frame-discrete cosine transform mode performs the inverse discrete cosine transform by using a part of coefficients included in (4×8)th-order discrete cosine transform coefficients input to achieve the field-discrete compression inverse discrete cosine transform, while replacing remaining coefficients by 0s, thus discarding the remaining coefficients, wherein the first compressed image data is MPEG2-image compressed data containing eighth-order discrete cosine transform coefficients in both the vertical direction and the horizontal direction, the image data decoding means is MPEG2-image data decoding means for decoding the MPEG2-image compressed data in both the vertical direction and the horizontal direction, by using only lower fourth-order coefficients included in the eighth-order discrete cosine transform coefficients, and the image data encoding means is MPEG4-image encoding means for encoding the serial-scan data from the scan converting means, thereby generating MPEG4-image compressed data, wherein the MPEG2-image data decoding means comprises motion-compensating means, wherein the motion-compensating means performs ¼-precision pixel interpolation in both the horizontal direction and the vertical direction in accordance with a motion vector contained in the input MPEG2-image compressed data, wherein, when pixel values outside an image frame are required to achieve twofold interpolation, the motion-compensating means performs one of a mirror process and a hold process, thereby generating a number of virtual pixel values equal to a number of taps provided in a filter in order to accomplish motion compensation, before performing the motion compensation, and wherein the motion-compensating means performs one of the mirror process and the hold process in units of fields.

17. The apparatus according to claim 2, wherein the scan-converting means preserves one of a first field and a second field of the interlaced-scan image data output from the MPEG2-image data decoding means, discards the one of the first and second fields not preserved, and performs twofold up-sampling on preserved pixel values, thereby converting the interlaced-scan data to serial-scan data.

18. The apparatus according to claim 2, wherein the MPEG2-image data decoding means has the function of decoding only a region composed of one or more macro blocks that surround an object in an intra-image encoded image/forward prediction encoded image.

19. The apparatus according to claim 2, further comprising motion-vector synthesizing means for generating a motion vector value corresponding to the image data subjected to scan conversion, from a motion vector data contained in the input MPEG2-image compressed data.

20. The apparatus according to claim 19, further comprising motion-vector detecting means for detecting a high-precision motion vector from the motion vector value generated by the motion-vector synthesizing means.

21. An image data converting method of converting first compressed image data to second compressed image data being more compressed than the first compressed image data, said first compressed image data being interlaced-scan data compressed by orthogonal transform and motion compensation, and said second compressed data being serial-scan data, said method comprising the steps of:

decoding the first compressed image data by using only lower mth-order orthogonal transform coefficients included in nth-order orthogonal transform coefficients (where m<n), in both a vertical direction and a horizontal direction in the first compressed image data;

converting interlaced-scan data output from the step of decoding to serial-scan data;

encoding the serial-scan data, thereby generating the second compressed image data; and wherein the step of decoding comprises performing compression inverse discrete-cosine transform of a frame-discrete cosine transform mode, wherein the compression inverse discrete-cosine transform of frame-discrete cosine transform mode performs the inverse discrete cosine transform by using a part of coefficients included in (4×8)th-order discrete cosine transform coefficients input to achieve the field-discrete compression inverse discrete cosine transform, while replacing remaining coefficients by 0s, thus discarding the remaining coefficients, wherein the first compressed image data is MPEG2-image compressed data containing eighth-order discrete cosine transform coefficients in both the vertical direction and the horizontal direction, the step of decoding the first compressed image data decodes the MPEG2-image compressed data in both the vertical direction and the horizontal direction, by using only lower fourth-order coefficients included in the eighth-order discrete cosine transform coefficients, and the step of encoding the serial-scan data encodes the serial-scan data, thereby generating MPEG4-image compressed data, wherein in the step of decoding the MPEG2-image compressed data, a compression inverse discrete-cosine transform of a frame-discrete cosine transform mode is performed by extracting only the lower fourth-order coefficients included in eighth-order discrete cosine transform coefficients and then fourth-order inverse discrete cosine transform is performed on the extracted lower fourth-order coefficients, in the horizontal direction, and field-discrete cosine transform is performed in the vertical direction, and wherein in the compression inverse discrete-cosine transform of frame-discrete cosine transform mode, only (4×4) and (4×2)th-order coefficients included in (4×8) th-order discrete cosine transform coefficients input are used to achieve inverse cosine transform, while replacing the remaining coefficients by 0s.

22. The method according to claim 21, wherein the code type of each frame in the interlaced-scan MPEG2-image compressed data is determined, data about an intra-image encoded image/forward prediction encoded image is output in accordance with the code type determined, data about a bi-directional prediction encoded image is discarded thereby to convert a frame rate, and the MPEG4-image compressed data is generated from the converted frame rate.

23. The method according to claim 22, wherein only the intra-image encoded image/forward prediction encoded image is decoded in the step of decoding the MPEG2-image compressed data.

24. The method according to claim 21, wherein in the step of decoding the MPEG2-image compressed data, variable-length decoding is performed on only the discrete cosine transform coefficients required in a discrete cosine transform, in accordance with whether a macro block of the input MPEG2-image compressed data is one of a field-discrete cosine transform mode and a frame-discrete cosine transform mode.

25. The method according to clam 21, wherein in the step of decoding the MPEG2-image compressed data, an inverse discrete-cosine transform of a field-discrete cosine transform mode is performed by extracting only the lower fourth-order coefficients included in eighth-order discrete cosine transform coefficients, in both the vertical direction and the horizontal direction, and then by performing fourth-order inverse discrete cosine transform on the extracted lower fourth-order coefficients.

26. The method according to claim 25, wherein the inverse cosine transform is carried out in both the horizontal direction and the vertical direction, by a method based on a predetermined fast algorithm.

27. The method according to claim 21, wherein the inverse cosine transform is carried out in both the horizontal direction and the vertical direction, by a method based on a predetermined fast algorithm.

28. The method according to claim 21, wherein in motion compensation performed in the step of decoding the MPEG2-image compressed data, ¼-precision pixel interpolation is carried out in both the horizontal direction and the vertical direction, in accordance with a motion vector contained in the input MPEG2-image compressed data.

29. The method according to claim 28, wherein in the step of performing motion compensation, ½-precision pixel interpolation is initially performed in the horizontal direction by using a twofold interpolation digital filter and then ¼-precision pixel interpolation is performed by means of linear interpolation.

30. The method according to claim 28, wherein in the step of performing motion compensation, ½-precision pixel interpolation is initially performed in a field, as vertical interpolation, by using a twofold interpolation digital filter, and then ¼-precision pixel interpolation is performed in the field by means of linear interpolation, when a macro block of the input MPEG2-image compressed data is of a field prediction mode.

31. The method according to claim 28, wherein in the step of performing motion compensation, ½-precision pixel interpolation is initially performed in a field, as vertical interpolation, by using a twofold interpolation digital filter, and then the ¼-precision pixel interpolation is performed in the field by means of linear interpolation, when a macro block of the input MPEG2-image compressed data is of a frame prediction mode.

32. The method according to claim 31, wherein in the step of performing motion compensation, a half-band filter is used as the twofold interpolation digital filter, to perform the interpolation.

33. The method according to claim 28, wherein in the step of decoding the MPEG2-image compressed data, pixel values are stored, and in the step of performing motion compensation, coefficients already calculated and equivalent to a sequence interpolating operations are applied, thereby to perform motion compensation on the stored pixel values, in accordance with the motion vector contained in the input MPEG2-image compressed data.

34. The method according to claim 28, wherein when pixel values outside an image frame are required to achieve twofold interpolation, one of mirror process and a hold process is performed, thereby generating a number of virtual pixel values equal to a number of taps provided in a filter required in order to accomplish the motion compensation.

35. An image data converting method of converting first compressed image data to second compressed image data being more compressed than the first compressed image data, said first compressed image data being interlaced-scan data compressed by orthogonal transform and motion compensation, and said second compressed data being serial-scan data, said method comprising the steps of:

decoding the first compressed image data by using only lower mth-order orthogonal transform coefficients included in nth-order orthogonal transform coefficients (where m<n), in both a vertical direction and a horizontal direction in the first compressed image data;

converting interlaced-scan data output from the step of decoding to serial-scan data;

encoding the serial-scan data, thereby generating the second compressed image data; and wherein the step of decoding comprises performing compression inverse discrete-cosine transform of a frame-discrete cosine transform mode, wherein the compression inverse discrete-cosine transform of frame-discrete cosine transform mode performs the inverse discrete cosine transform by using a part of coefficients included in (4×8)th-order discrete cosine transform coefficients input to achieve the field-discrete compression inverse discrete cosine transform, while replacing remaining coefficients by 0s, thus discarding the remaining coefficients, wherein the first compressed image data is MPEG2-image compressed data containing eighth-order discrete cosine transform coefficients in both the vertical direction and the horizontal direction, the step of decoding the first compressed image data decodes the MPEG2-image compressed data in both the vertical direction and the horizontal direction, by using only lower fourth-order coefficients included in the eighth-order discrete cosine transform coefficients, and the step of encoding the serial-scan data encodes the serial-scan data, thereby generating MPEG4-image compressed data, wherein in motion compensation performed in the step of decoding the MPEG2-image compressed data, ¼-precision pixel interpolation is carried out in both the horizontal direction and the vertical direction, in accordance with a motion vector contained in the input MPEG2-image compressed data, wherein, when pixel values outside an image frame are required to achieve twofold interpolation, one of mirror process and a hold process is performed, thereby generating a number of virtual pixel values equal to a number of taps provided in a filter required in order to accomplish the motion compensation, and wherein in the step of performing the motion compensation, the mirror process or the hold process is carried out in units of fields.

36. The method according to claim 21, wherein in the step of converting, a first field or a second field of the interlaced-scan image data is preserved, and the one of the first and second fields that is not preserved is discarded, and twofold up-sampling is performed on preserved pixel values, thereby converting the interlaced-scan data to serial-scan data, said first and second fields being contained in the MPEG2-image compressed data that has been decoded.

37. The method according to claim 21, wherein only a region composed of one or more macro blocks that surround an object in an intra-image encoded image/forward prediction decoded image is encoded in the step of decoding the MPEG2-image compressed data.

38. The method according to claim 21, wherein a motion vector value corresponding to the image data subjected to scan conversion is synthesized from motion vector data contained in the input MPEG2-image compressed data.

39. The method according to claim 38, wherein a high-precision motion vector is detected from the motion vector value that has been synthesized.

* * * * *

UNITED STATES PATENT AND TRADEMARK OFFICE
CERTIFICATE OF CORRECTION

| | |
|---|---|
| PATENT NO. | : 7,088,775 B2 |
| APPLICATION NO. | : 09/765852 |
| DATED | : August 8, 2006 |
| INVENTOR(S) | : Kazushi Sato et al. |

It is certified that error appears in the above-identified patent and that said Letters Patent is hereby corrected as shown below:

Column 20, line 46, change "claim 21" to --claim 35--.
Column 20, line 54, change "claim 21" to --claim 35--.
Column 20, line 59, change "claim 21" to --claim 35--.

Signed and Sealed this

Twelfth Day of June, 2007

JON W. DUDAS
*Director of the United States Patent and Trademark Office*